Figure 1:
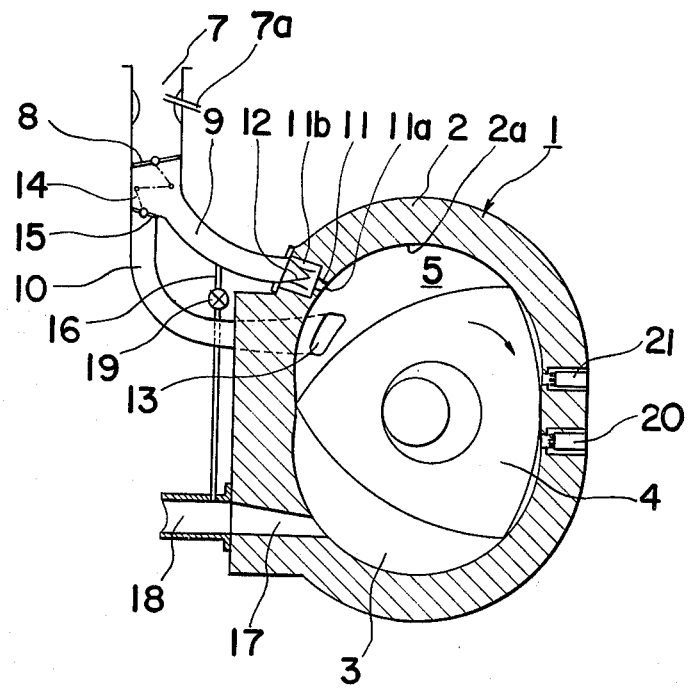

United States Patent [19]

Satow

[11] 4,084,549
[45] Apr. 18, 1978

[54] ROTARY PISTON ENGINE EXHAUST GAS RECYCLING MEANS

[75] Inventor: Haruhiko Satow, Hiroshima, Japan

[73] Assignee: Toyo Kogyo Co., Ltd., Japan

[21] Appl. No.: 668,513

[22] Filed: Mar. 19, 1976

[30] Foreign Application Priority Data

Apr. 3, 1975 Japan .................................. 50-40636

[51] Int. Cl.² ............................................. F02B 53/10
[52] U.S. Cl. .................................... 123/217; 123/242; 60/901; 123/119 A
[58] Field of Search .................. 123/8.13, 8.45, 119 A; 60/901, 278

[56] References Cited

U.S. PATENT DOCUMENTS

| 3,507,261 | 4/1970 | Myers | 60/901 X |
| 3,780,707 | 12/1973 | Cole | 123/8.13 |
| 3,791,145 | 2/1974 | Yamamoto | 123/901 |
| 3,795,228 | 3/1974 | Shimizu | 60/901 |
| 3,867,910 | 2/1975 | Galonska | 123/119 A |
| 3,905,337 | 9/1975 | Shimoji | 123/8.13 |
| 4,009,689 | 3/1977 | Walters | 123/8.13 |

*Primary Examiner*—Clarence R. Gordon
*Attorney, Agent, or Firm*—Wenderoth, Lind & Ponack

[57] ABSTRACT

Exhaust gas recycling means by which exhaust gas is recycled and introduced, via a port which is formed in the peripheral wall of a rotary piston engine and which port may also serve for introduction of air or an air-fuel mixture required for low-speed operation of the engine, into a leading zone of an intake chamber. Since the port formed in the peripheral wall is so disposed that the air or air-fuel mixture introduced therethrough tend to be stratified at the leading zone of the intake chamber, the recycled exhaust gas also tends to be stratified at the same leading zone so that the recycled exhaust gas tends to exist in vicinity of the spark plug, whereby less exhaust gas is required to be recycled since a given amount of exhaust gas is more effective in preventing production of nitrogen oxides, and there is correspondingly less engine wear and attendant production of hydrocarbons or similar compounds.

10 Claims, 4 Drawing Figures

ROTARY PISTON ENGINE EXHAUST GAS RECYCLING MEANS

The present invention relates to exhaust gas recycling means. More particularly the invention relates to means for effective recycling of exhaust gas in a rotary piston engine.

It is considered desirable to suppress or keep to a minimum the amount unburned noxious products resulting from combustion of an air-fuel mixture in an internal combustion engine. Such suppression can be effected to a certain extent by selection of suitable fuels and air-fuel ratios employed in mixtures which are explosively burned in the engine. However, a basic problem in suppression of these products, is that production of different products is promoted at different temperatures, and different temperatures are obtained in different portions of the combustion chamber of the engine, since in currently known engines generation of heat to cause combustion of the air-fuel mixture is effected at a point-location, or locations, in the combustion chamber, e.g., at a spark plug location, and there is inevitably a temperature gradient through the combustion chamber, the temperature being highest at the spark plug location.

One group of undesirable noxious products or substances is nitrogen oxides, having the general formula NOx, the production of which is favoured by the high temperature generated to effect combustion of the air-fuel mixture i.e., production of NOx is particularly liable to occur in the vicinity of the spark plug. It has long been appreciated that in a rotary piston engine comprising a casing including a peripheral wall having an epitrochiodal inner surface and a pair of side walls secured to the opposite sides of the peripheral wall to define therein a cavity, and a three-lobed rotor which rotates excentrically in the cavity and has apex portions in sliding engagement with the trochoidal inner surface for successively defining working chambers of variable volume, that is, an intake chamber, compression chamber, combustion chamber, and expansion and exhaust chamber during rotation of the rotor, production of NOx can be prevented by introducing into the air-fuel mixture to be burned a certain amount of exhaust gas the effect of which is to inhibit to a certain extent combustion of the air-fuel mixture. Although in theory this procedure can be very effective in preventing production of NOx it is evident that the result of recycling of an excess amount of exhaust gas in this manner is to effectively alter the fuel-air ratio in the combustion chamber of the engine to such an extent that combustion is overinhibited and there is undue production of carbon monoxide and other undesirable substances which result from incomplete combustion of the air-fuel mixture.

Conventional exhaust gas recycling means in the rotary piston engine supplies exhaust gas into the intake chamber in such a manner that the exhaust gas is distributed evenly in the working chamber. This has two disadvantages which are linked to each other. One disadvantage is that, in order to ensure the presence in the vicinity of a spark plug location of a sufficient amount of recycled exhaust gas to effect requisite inhibition of combustion, a comparatively large total amount of exhaust gas must be supplied into the working chamber, with consequent increase in abrasion and wear of engine parts provided in the cavity. Such wear is particularly objectionable, since these portions of the engine are required to maintain precise dimensions in order to ensure efficient engine operation.

The other main disadvantage is that, being evenly distributed, the recycled exhaust gas has a generally equal inhibitory effect on combustion in high temperature portions of the combustion chamber and in lower temperature portions thereof, with the result that conventional recycling means have been found to give rise to production of CO, HC and other substances in portions of the combustion chamber in which combustion is inevitably poorer, and combustion being particularly poor in the trailing zone of the working chamber, i.e., a zone further removed from a spark plug location, considering the combustion, or the zone of the working chamber opposite to the rotation of the rotor. While it can be appreciated that these problems can be overcome by causing recycled exhaust gas to concentrate or stratify in the portion of the combustion chamber in which highest temperatures are produced, i.e., in the vicinity of a spark plug, because of the nature of gas, it has been found difficult hitherto to effect this concentration with a suitable degree of reliability.

It is an object of the invention to provide exhaust gas recycling means which permits suppression of nitrogen oxide production in a rotary piston engine but requires only a small amount of exhaust gas to be recycled, whereby wear of engine parts is reduced and engine efficiency is maintained.

It is further object of the invention to provide exhaust gas recycling means which permits improved concentration of recycled exhaust gas in the vicinity of a spark plug in a rotary piston engine, whereby requisite inhibition of combustion to suppress nitrogen oxide formation may be achieved with only a small amount of recycled exhaust gas.

It is another object of the invention to provide an exhaust gas recycling means in which the amount of recycled exhaust gas is varied in accordance with engine speed or load and improved concentration of recycled gas is achieved.

In accomplishing these and other object, the rotary piston engine of the present invention comprises a casing including a peripheral wall having an epitrochoidal inner surface and a pair of side walls secured to the opposite sides of the peripheral wall to define therein a cavity, a three-lobed rotor which rotates eccentrically in the cavity and has apex portions in sliding contact with the epitrochoidal inner surface for simultaneously defining intake, compression, combustion, expansion and exhaust chambers between the epitrochoidal inner surface and flanks of the rotor, first intake port means provided in the casing and communicated with the intake chamber, first intake passage means connected to the first intake port means for supplying a combustion charge, that is, air or an air-fuel mixture to the intake chamber in such a manner combustion charge which tends to be stratified is obtained in a portion of the intake chamber, second intake port means provided in the casing and communicated with the intake chamber, second intake passage means connected to the second intake port means, throttle valve means provided in the second intake passage means and adapted to be open under a high load operation of the engine, an exhaust system including exhaust port means provided in the casing and communicated with the exhaust chamber and exhaust passage means connected to the exhaust port means, first exhaust gas recycling passage means connecting the exhaust system to the first intake passage means, and ignition means provided on the casing.

In operation during low load operation of the engine, since the throttle valve in the second intake passage is closed, there is supplied through the first intake port means to the intake chamber a combustion charge and recycled exhaust gas so that recycled exhaust gas is concentrated in the portion of the intake chamber.

During high load operation of the engine, since the throttle valve is opened, there is supplied through both the first and second intake port means to the intake chamber a combustion charge of air or an air-fuel mixture, and recycled exhaust gas is supplied to the intake chamber through the first intake port means. At this time, also most of recycled exhaust gas is concentrated in the one portion of the intake chamber.

Therefore, in the present invention, less exhaust gas is required to be recycled since the recycled amount of exhaust gas is more effective in preventing production of nitrogen oxides, and there is correspondingly less engine wear and attendant production of hydrocarbons or similar compounds.

In order to obtain a better effect in preventing production of nitrogen oxides by recycling less exhaust gas, it is preferable to provide the first intake port means in such a manner that recycled exhaust gas is concentrated in the vicinity of a spark plug for the combustion chamber. When a combustion charge and recycled exhaust gas from the first intake port means is concentrated in the leading zone of the intake chamber, it is further preferable to prevent production of nitrogen oxides and other noxious compounds and to obtain better fuel consumption. For preventing engine trouble, control valve means may be provided in the exhaust gas recycling passage to close the exhaust gas recycling passage during idling or very low load operation.

In high load operation, since an excess amount of combustion charge is supplied to the intake chamber and the combustion charge is forcefully burned in the combustion chamber, it is preferable to increase an amount of recycled exhaust gas.

Although there is a limit to the rate at which exhaust gas may be supplied to the intake chamber through the first intake passage means, when it is required to increase the amount of recycled exhaust gas beyond the abovementioned limit during high load operation, this amount can be supplied to the intake chamber through a second intake passage means. In this case, although there is inevitably some dispersion of recycled exhaust gas under high load operation, recycled exhaust gas under low load operation is more concentrated in the one portion, that is, the leading zone, of the intake chamber than in the remainder of the chamber.

Figure 2:
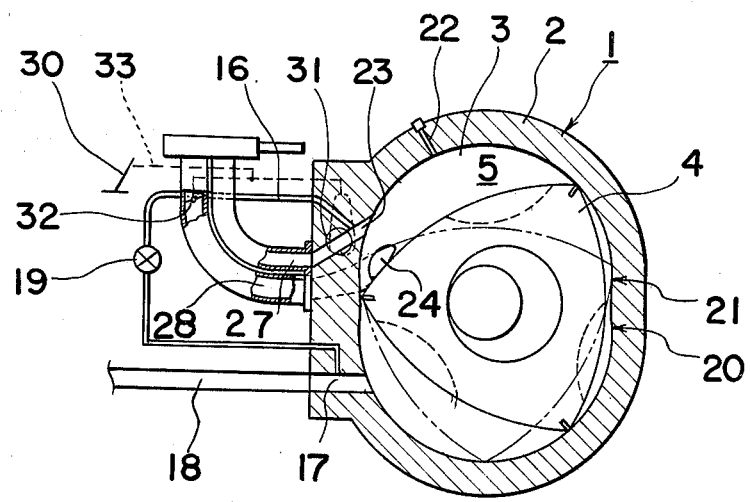
Figure 3:
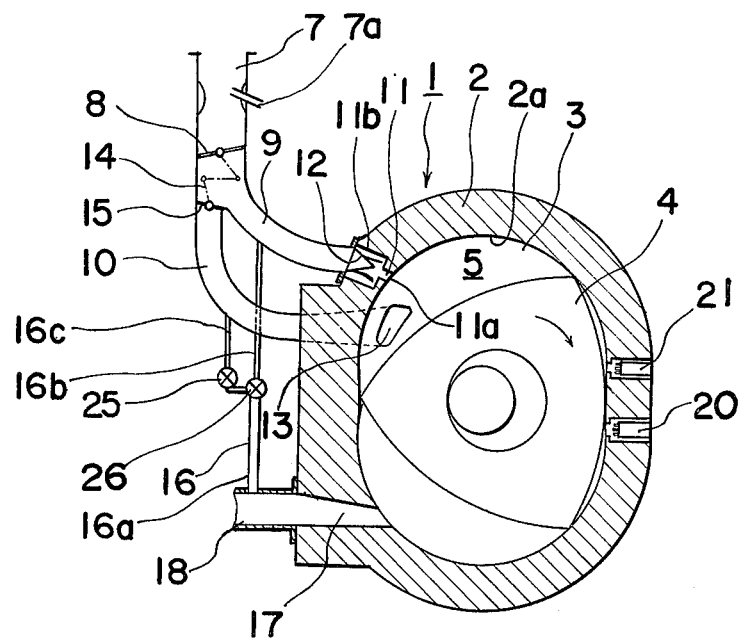
Figure 4:
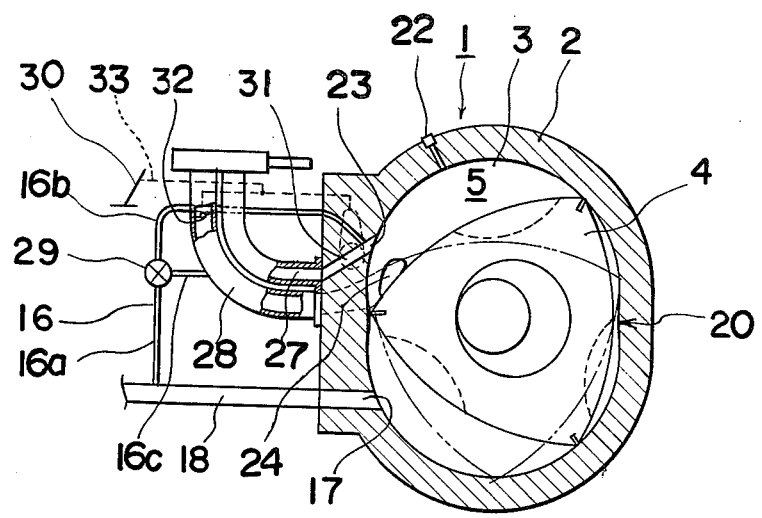

A better understanding of the present invention may be had from the following full description thereof when read in reference to the attached drawings, in which like numbers refer to like parts, and FIG. 1 is a schematic cross-sectional view showing exhaust gas recycling means according to a first embodiment of the invention provided in a rotary piston engine having a common air and fuel intake means;

FIG. 2 is a schematic cross-sectional view showing the exhaust gas recycling means according to a second embodiment of the invention provided in a rotary piston engine employing independent air intake and fuel intake means; and FIGS. 3 and 4 are similar views to FIGS. 1 and 2, respectively, and each shows third and fourth embodiment of the invention, respectively.

Referring to FIG. 1 there are shown principal portions of a rotary piston engine comprising a casing 1 including a peripheral wall 2 having an epitrochoidal inner surface 2a and a pair of side walls 3 secured to the opposite sides of the peripheral wall 2 to define therein a cavity and a three-lobed rotor 4 which is connected to and drives a drive transmission shaft means not shown and rotates eccentrically in the cavity. The rotor has apex portions in sliding contact with the epitrochoidal inner surface 2a for defining working chambers 5 of variable volume, that is, intake, compression, combustion, expansion and exhaust chambers between the epitrochoidal inner surface 2a and flanks of the rotor 4. A recess, not shown, is provided on each flank of the rotor 4.

Communicating with the combustion chamber there is provided a leading end spark plug 20 and a trailing end spark plug 21, that is in terms of rotation of the rotor 4 the spark plug 20 is positioned more forwardly than spark plug 21. The spark plugs 20 and 21 are actuated in a known manner to ignite an air-fuel mixture brought to the compression and combustion chamber whereby the air-fuel mixture is burned and forces the rotor 4 to rotate, thus bringing the burned air-fuel mixture to the exhaust chamber. As is known, with this arrangement production of NOx is particularly liable to occur in the vicinity of the leading end spark plug 20, when the spark plug 20 is ignited. Burned products brought to the exhaust chamber are removed via an exhaust port 17 communicating with an exhaust passage 18.

An air-fuel mixture for the engine is supplied by a carburetor 7a via a horn or venturi portion 7 fitted with a throttle valve 8. The carburetor 7a includes suitable known circuits, not shown, for operation of the engine at various speeds or in various conditions. Communication between the horn 7 and the intake chamber 5 is provided by a branch intake passage 9 and a branch intake passage 10 which both connect to a junction downstream of the throttle valve 8, and which are in independent communication with the intake chamber 5. The air-fuel mixture is supplied into the intake chamber 5 via the intake passage 9 during low-speed and high-speed operation or low-load and high-load operation of the engine, and via the intake passage 10 only during high-speed or high-load operation of the engine. In the present invention, the term "speed" may be also read as "load" in the following description.

The intake passage 9 is connected to a peripheral intake port 11 comprising an opening 11a formed in the inner surface 2a of the peripheral wall 2 and a mounting portion 11b, which is somewhat larger in diameter than, and, in terms of flow of air-fuel mixture, precedes the opening 11a, and in which a reed valve 12 is provided. The opening 11a is suitably, but not essentially, in the form of an elliptical slot having a major axis generally normal to the side walls 2. The reed valve 12 acts to maintain, or promote, vaporization of the air-fuel mixture which is supplied at comparatively high-speed through the small opening 11a. The intake passage 9 and the peripheral intake port 11 are suitably so disposed that the air-fuel mixture is directed toward the leading zone of the intake chamber 5 and, in the combustion chamber, the air-fuel mixture tends to be stratified and is more concentrated in the vicinity of the spark plug 20 than in the remainder of the chamber.

The intake passage 10 communicates with the intake chamber 5 via a side intake port 13 which is formed in a side wall 2 of the casing 1, and which, compared to the peripheral intake port 11 of the intake passage 9, is located nearer to the trailing end zone of the intake chamber, i.e., further from the spark plugs 21 and 20. The intake opening defined by the side intake port 13 is larger than the opening 11a of the peripheral intake port 11. At the entry of the intake passage 10, there is provided a throttle valve 15 which is connected by a suitable link means 14 to the throttle valve 8 in the carburetor horn 7. During idling and lowspeed operation of the engine, the throttle valve 15 remains closed, even though throttle valve 8 is opened to a certain extent, whereby the air-fuel mixture is supplied into the intake chamber 5 via the intake passage 9 only and a generally stratified airfuel mixture, i.e. a mixture which tends to be stratfied is obtained in the vicinity of the spark plug 20. When the engine reaches a suitably determined highspeed range and throttle valve 8 is opened to permit supply of a larger amount of air-fuel mixture from the carburetor 7a, the link means 14 causes the throttle valve 15 to open, whereby the air-fuel mixture is supplied into the intake chamber 5 via both supply lines 9 and 10, the degree of opening of the throttle valve 15 being increased as the engine speed or engine load increases.

The intake passage 9 is connected to the exhaust passage 18 by a comparatively small-diameter exhaust gas recycling passage 16 in which there is provided a flow control valve 19. The exhaust gas recycling passage 16 may be connected to the exhaust system, that is, the exhaust chamber, the exhaust port or the exhaust passage. The degree of opening of the flow control valve 19 is controlled in response to the engine speed or engine load by suitable known means, not shown, for example a pressure-sensitive means which adjusts the control valve 19 opening proportionally to the degree of negative pressure obtaining at a particular point in the carburetor horn 7 or the intake passage 9 or 10, or a mechanical connection means which adjusts the control valve 19 opening proportionally to rotatory speed of the rotor shaft.

During idling and very low speed operation of the engine the flow control valve 19 remains completely closed, and therefore no exhaust gas enters the intake passage 9. When engine speed reaches a certain speed in the low-speed range the control valve 19 is opened to a certain degree, thereby permitting a certain amount of exhaust gas from the exhaust passage 18 to pass via the exhaust gas recycling passage 16 and enter the intake passage 9. As the engine speed increases beyond this point the degree of opening of the control valve 19 is gradually increased, until high-speed operation of the engine is reached, when the valve 19 is completely opened.

Thus, during low-speed operation of the engine the intake passage 10 is closed and both the air-fuel mixture and the exhaust gas are supplied via the intake passage 9 into the intake chamber 5.

Since the intake passage 9 and the peripheral intake port 11 are so disposed that the air-fuel mixture introduced is concentrated at the leading zone and, in the combustion chamber, a generally stratified air-fuel mixture is obtained in the vicinity of the spark plug 20, recycled exhaust gas is also more concentrated in the vicinity of the spark plug 20 than in the remainder of the chamber. As a result, less exhaust gas is required to be recycled since the amount of exhaust gas recycled is more effective in preventing production of nitrogen oxides.

In addition, during high-load operation of the engine, the throttle valve 15 is opened and thus the air-fuel mixture is supplied both through the peripheral intake port 11 and the side intake port 13, and since recycled exhaust gas is supplied only through the peripheral intake port 11 and the peripheral intake port 11 via which the air-fuel mixture and exhaust gas is supplied is located forwardly with respect to the side intake port 13, there is therefore further concentration of exhaust gas in the portion of the mass of air-fuel which is near the spark plug location at the moment of ignition.

Since this portion of the air-fuel mixture in which there is a higher concentration of exhaust gas is that portion of the combustion chamber which is ignited in order to provoke combustion of the mixture as a whole, it is evident that with the means of the invention a given amount of recycled exhaust gas has a greater effect in the suppression of NOx production at a spark plug location. In other words, in the present invention equal suppression of NOx production can be achieved with a smaller amount of recycled exhaust gas than is the case when there is a comparatively even distribution of recycled exhaust gas in the combustion chamber.

On the other hand, both because the absolute amount of recycled exhaust gas is smaller and because there is a lower concentration of exhaust gas in those portions of the air-fuel mixture which are furthest removed from the point of initial ignition, and in which combustion is normally liable to be incomplete, recycled exhaust gas has much less effect in inhibiting complete combustion of these portions of the mixture, and the combustion process is therefore accompanied by less production of CO or HC compounds.

When the engine is running in the high load range, a large amount of air-fuel mixture is supplied to the intake chamber since the throttle valves 8 and 15 are opened, and therefore in the high load range it is preferable to increase the amount of recycled exhaust gas.

Thus the invention permits suppression of NOx production, without favouring production of CO, HC, or other undesirable products, and, since less recycled exhaust gas is required, achieves this with less engine wear, the invention presenting particular advantages in the low-speed range of a rotary engine. A further advantage of less exhaust gas requiring to be recycled is of course that there is less heating of the engine by exhaust gas.

Reference is now had to FIG. 2 which illustrates employment of the means of the invention in a rotary piston engine having an independent fuel injection nozzle 22 which is provided in the peripheral wall 2 and communicates with the intake chamber 5, and separate air intake ports 23 and 24, the air intake port 23 being provided in the peripheral wall 2 of the casing 1 to the leading end of the intake chamber 5, and being smaller than the air intake port 24, being constantly employed for supply of air into the intake chamber 5, serving for introduction of recycled exhaust gas into the intake chamber, and being so disposed that air and exhaust gas supplied therethrough are directed toward the leading zone of the intake chamber, and the air intake port 24 being provided in the side wall 3 and being employed for supply of air into the intake chamber 5 only during high-speed or high load operation of the engine. Air from a suitable source is supplied to the air intake ports 23 and 24 respectively via air intake passages 27 and 28, which are fitted with a first flow control valve 31 and second flow control valve 32, respectively. The first and second flow control valves 31 and 32 are both controlled by the accelerator pedal 30, shown schematically in FIG. 2, acting through a link means 33 indicated schematically by the dashed line portion in the drawing, the operation being such that as the accelerator pedal 30 is depressed first the first flow control valve 31 in the air intake passage 27 is gradually opened while the second valve 32 for control of air supply along the air intake passage 27 remains closed, and then, after the first flow control valve 31 has been opened, the second flow control valve 32 is gradually opened.

Exhaust gas from the exhaust port 17 is recycled via the exhaust gas recycling passage 16 fitted with a control valve 19, which is actuated in the same manner as described in reference to FIG. 1, into the air intake passage 27, at a point thereof which is downstream relative to the first control valve 31 in terms of air flow along the air intake passage 27.

The embodiment shown in FIG. 2 accomplishes the same result as that shown in FIG. 1 in preventing production of nitrogen oxides.

Referring now to FIG. 3 there is shown a third embodiment of the invention suitable for a rotary piston engine which is large or which may run at very high speed. The engine shown in FIG. 3 is of the same type as that shown in FIG. 1, and there is connected to the exhaust passage 18 thereof an exhaust gas recycling passage 16a which branches into two recycling lines 16b and 16c which lead respectively to the intake passage 9 and intake passage 10. At the junction of the recycling lines 16b and 16c there is provided a flow control valve 26 which functions in the same manner as the valve 19 described in reference to FIGS. 1 and 2, and in recycling line 16c there is provided a flow control valve 25, which remains closed while the engine is running in the lowspeed range, the valve 25 suitably being controlled by the engine speed or negative vacuum of the intake passage in a manner similar to that of control of the valve 26. The valve 25 may be adapted to actuate in response to the operation of the throttle valve 15. The valve 25 may be opened at the same time the throttle valve 15 is opened or after the throttle valve 15 is opened.

During idling and very low speed operation of the engine, the intake passage 10 is closed by the throttle valve 15, the air-fuel mixture is supplied into the intake chamber 5 via the intake passage 9, and no exhaust gas is recycled since both the control valves 26 and 25 are closed. As speed increases, the control valve 26 also is gradually opened, the throttle valve 15 and the control valve 25 remaining closed, and a certain amount of exhaust gas is recycled into the intake chamber 5 via intake passage 9.

As engine speed increases from the low-speed range to the high-speed range, at first, the control valve 26 is opened further, the throttle valve 8 in the carburetor horn 7 is opened more fully, the maximum supply of air-fuel mixture which may be carried by intake passage 9 is supplied into the intake chamber via the peripheral intake port 11, and the throttle valve 15 is gradually opened whereby the air-fuel mixture is supplied into the intake chamber via the intake passage 13 also, but the flow control valve 25 in the recycling line 16b remains closed, exhaust gas thus being recycled via the peripheral intake port 11 only, and the operation up to this point being as described in reference to the first embodiment.

If engine moves into a very high speed range, in which the amount of exhaust gas recyclable via the recycling line 16b is not sufficient to maintain the overall proportion of exhaust gas in the air-fuel mixture in the working chamber at a level high enough to insure effective suppression of NOx production, the flow control valve 25 in recycling line 16c also is opened, whereby exhaust gas is supplied into the intake chamber via the intake passage 13 also, valve 25 being gradually opened further as engine speed increases in the very high speed range and the necessary proportion of exhaust gas in the working chamber thus being maintained.

It is evident that during very high speed operation of the engine, since exhaust gas is supplied into the intake chamber via the side intake port 13, there is less stratification of air-fuel mixture and exhaust gas in the working chamber and there is less efficient action than during low-speed and medium high speed operation of the engine. However, the advantages noted previously are completely achieved during low-speed and medium high speed opperation of the engine. Also, as engine speed moves into the very high speed range these advantages are still substantially achieved, since a definite proportion of recycled exhaust gas is supplied into the intake chamber via the peripheral intake port 11, and also since for each engine cycle, peripheral intake port 11 is disposed forward of the side intake port 13. During very high speed operation of the engine, since a great amount of air-fuel mixture is supplied, it is better that exhaust gas is recycled through the peripheral intake port 11 and the side intake port 13 for suppression of NOx production.

In FIG. 4 the exhaust gas recycling means according to the fourth embodiment of the invention is shown employed in a rotary piston engine having separate fuel intake and air intake means, and comprises branch recycling lines 16b and 16c respectively connecting air intake passages 27 and 28 recycling of exhaust gas being controlled by a flow control valve 29. The control valve 29 may be opened in response to pressure variations, in the carburetor horn 7, or in the air intake passage 27, 28, for example, or may be controlled in response to engine speed, in which case the control valve 29 may be connected to the link means 33.

The exhaust gas recycling passage may be connected to the exhaust system, that is, the exhaust chamber, the exhaust port, the exhaust passage, etc.

Needless to say, although from the point of view of compactness of construction exhaust gas is recycled via a port for intake of air or the air-fuel mixture, it is possible to provide a separate, suitably located port or ports for recycled gas, in which case exhaust gas may be caused to concentrate in a required portion of an engine working chamber in all ranges of engine speed. This and other modifications are possible and are contemplated, and there is therefore no intention of limiting the invention to the exact details shown and described above.

What is claimed is:

1. A rotary piston engine comprising a casing which includes a peripheral wall having an epitrochiodal inner surface and a pair of side walls secured to the opposite sides of the peripheral wall to define therein a cavity, a three-lobed rotor which rotates eccentrically in the cavity and has apex portions in sliding contact with the epitrochiodal inner surface for simultaneously defining intake, compression, combustion, expansion and exhaust chambers between the epitrochiodal inner surface and flanks of the rotor, first intake port means provided in the casing and directed into said intake chamber toward the leading, with respect to the direction of rotation of said rotor, portion of the intake chamber, first intake passage means connected to the first intake port means for supplying a combustion charge to the intake chamber, second intake port means provided in the casing and communicated with the intake chamber, second intake passage means connected to the second intake port means, said first intake port means being provided in the peripheral wall of said casing and having a smaller opening than that of the second intake port means for tending to cause the combustion charge to be present in the leading portion of the intake chamber, throttle valve means provided in the second intake passage means and adapted to be opened under a high load operation of the engine, an exhaust system including exhaust port means provided in the casing and communicated with the exhaust chamber and exhaust passage means connected to the exhaust port means, first exhaust gas recycling passage means connecting the exhaust system to the first intake passage means for continuously supplying the recycled exhaust gas to the first intake passage means so that the recycled exhaust gas is obtained in said leading portion of the intake chamber in which the combustion charge tends to be present, and ignition means provided on the casing.

2. A rotary piston as claimed in claim 1 wherein the first intake port means is disposed to supply combustion charge and recycled exhaust gas therefrom to the intake chamber in such a manner that a generally stratified combustion charge and exhaust gas are obtained in the vicinity of the ignition means.

3. A rotary piston engine as claimed in claim 1 further comprising control valve means provided in the first exhaust gas recycling passage means for controlling the amount of recycled exhaust gas in response to the engine operation.

4. A rotary piston engine as claimed in claim 1 further comprising second exhaust gas recycling passage means connected to the exhaust system and said second intake passage means downstream of the throttle valve, further control valve means in the second exhaust gas recycling passage for closing the second exhaust gas recycling passage under low-load and low-speed operation of the engine and controlling the amount of recycled exhaust gas during high speed operation.

5. A rotary piston engine as claimed in claim 1 wherein the second intake port means is provided on the side wall.

6. A rotary piston engine as claimed in claim 5 further comprising control valve means provided in the first exhaust gas recycling passage means for controlling the amount of recycled exhaust gas in response to the engine operation.

7. A rotary piston engine as claimed in claim 5 further comprising second exhaust gas recycling passage means connected to the exhaust system and said second intake passage means downstream of the throttle valve, further control valve means in the second exhaust gas recycling passage for closing the second exhaust gas recycling passage under low-load and low-speed operation of the engine and controlling the amount of recycled exhaust gas during high speed operation.

8. A rotary piston engine as claimed in claim 5 wherein said engine includes a combustion charge supplying means for supplying an air-fuel mixture to said intake passage means.

9. A rotary piston engine as claimed in claim 8 wherein the combustion charge supplying means is connected to said first intake passage means and said second intake passage means is branched from said first intake passage means.

10. A rotary piston engine as claimed in claim 5 further comprising fuel injection means provided on the casing for supplying fuel into the intake chamber, and air supplying means connected to said intake passage means.

* * * * *